US012633444B2

(12) United States Patent
Kikuchi

(10) Patent No.: US 12,633,444 B2
(45) Date of Patent: May 19, 2026

(54) INDUCTOR

(71) Applicant: Murata Manufacturing Co., Ltd., Kyoto-fu (JP)

(72) Inventor: Seiya Kikuchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 817 days.

(21) Appl. No.: 17/934,424

(22) Filed: Sep. 22, 2022

(65) Prior Publication Data

US 2023/0100398 A1 Mar. 30, 2023

(30) Foreign Application Priority Data

Sep. 25, 2021 (JP) ................................ 2021-156215

(51) Int. Cl.
*H01F 27/28* (2006.01)
*H01F 41/04* (2006.01)

(52) U.S. Cl.
CPC ....... *H01F 27/2804* (2013.01); *H01F 41/041* (2013.01); *H01F 2027/2809* (2013.01)

(58) Field of Classification Search
CPC ............... H01F 27/2804; H01F 41/041; H01F 2027/2809; H01F 27/292; H01F 2017/002; H01F 2017/004; H01F 17/0013
USPC ................................ 336/200, 192, 232, 223
See application file for complete search history.

(56) References Cited

U.S. PATENT DOCUMENTS

| | | | | |
|---|---|---|---|---|
| RE47,950 | E * | 4/2020 | Ishii | H01F 27/292 |
| 2018/0286565 | A1* | 10/2018 | Aoki | H01F 17/0013 |

FOREIGN PATENT DOCUMENTS

| | | | |
|---|---|---|---|
| CN | 104011812 | A | 8/2014 |
| JP | 2000-286125 | A | 10/2000 |
| JP | 2017-157770 | A | 9/2017 |
| JP | 2018-184582 | A | 11/2018 |
| WO | 2013/108862 | A1 | 7/2013 |

* cited by examiner

*Primary Examiner* — Lincoln D Donovan
(74) *Attorney, Agent, or Firm* — Studebaker Brackett PLLC

(57) ABSTRACT

An inductor comprising a component main body including a non-conductive material, and a coil inside the component main body and having a plurality of line conductors, each extending along a principal surface of the component main body, and a plurality of via conductors each extending perpendicularly to the principal surface of the component main body. The plurality of via conductors include a curved via conductor in a long and curve shape extending along a first line conductor which is one of the line conductors and is connected to the curved via conductor.

20 Claims, 16 Drawing Sheets

INDUCTOR

CROSS-REFERENCE TO RELATED APPLICATION

This application claims benefit of priority to Japanese Patent Application No. 2021-156215, filed Sep. 25, 2021, the entire content of which is incorporated herein by reference.

BACKGROUND

Technical Field

The present disclosure relates to inductors and, in particular, to an inductor in which a coil is arranged inside a component main body made of a non-conductive material.

Background Art

An inductor interesting for the present disclosure includes a component main body having a multilayer structure formed with a plurality of non-conductive material layers laminated together. Inside the component main body, a coil is arranged. The coil is configured of a plurality of line conductors each extending along an interface between the non-conductive material layers and a plurality of via conductors penetrating through the non-conductive material layers in a thickness direction, and has a form of extending along a helical orbit as a whole by the line conductors and the via conductors alternately connected together.

FIG. 32 schematically depicts an inductor 1. In FIG. 32, a component main body 2 included in the inductor 1 and a coil 3 arranged inside the component main body 2 are depicted in a state of being transparently viewed in an axis-line direction of the coil 3 (direction orthogonal to the sheet of FIG. 32).

The component main body 2 has a multilayer structure formed with a plurality of non-conductive material layers extending in the direction of the sheet of FIG. 32 and laminated together. The coil 3 is configured of a plurality of line conductors 4-1 through 4-5 each extending along an interface between the non-conductive material layers and a plurality of via conductors 5-1 through 5-4 penetrating through the non-conductive material layers in the thickness direction, and has a form of extending along a helical orbit as a whole by the line conductors 4-1 through 4-5 and the via conductors 5-1 through 5-4 alternately connected together. On the outer surface of the component main body 2, a first external terminal electrode 6 and a second external terminal electrode 7 connected to one end and the other end, respectively, of the coil 3 are provided.

With reference to FIG. 32, connections of the plurality of line conductors 4-1 through 4-5 in the coil 3 are more specifically described. To make, for example, four via conductors 5-1 through 5-4 depicted in the drawing distinguished from one another, the four via conductors 5-1 through 5-4 are provided with reference numerals "5-1", "5-2", "5-3", and "5-4", respectively, as indicated herein. Also, five line conductors 4-1 through 4-5 connected via the four via conductors 5-1, 5-2, 5-3, and 5-4 are provided with reference numerals "4-1", "4-2", "4-3", "4-4", and "4-5", respectively, as indicated herein. While the line conductors 4-1, 4-2, 4-3, 4-4, and 4-5 are each provided so as to extend along a different interface between the non-conductive material layers, the interface provided with the line conductor 4-1, the interface provided with the line conductor 4-2, the interface provided with the line conductor 4-3, the interface provided with the line conductor 4-4, and the interface provided with the line conductor 4-5 are aligned in the laminating direction of the non-conductive material layers.

The line conductor 4-1 connected via a first extended conductor 8 to the first external terminal electrode 6 extends to the position of the via conductor 5-1 in a clockwise direction. The via conductor 5-1 connects the line conductor 4-1 and the line conductor 4-2 together. The line conductor 4-2 extends from the position of the via conductor 5-1 to the position of the via conductor 5-2 in a clockwise direction. The via conductor 5-2 connects the line conductor 4-2 and the line conductor 4-3 together. The line conductor 4-3 extends from the position of the via conductor 5-2 to the position of the via conductor 5-3 in a clockwise direction. The via conductor 5-3 connects the line conductor 4-3 and the line conductor 4-4 together. The line conductor 4-4 extends from the position of the via conductor 5-3 to the position of the via conductor 5-4 in a clockwise direction. The via conductor 5-4 connects the line conductor 4-4 and the line conductor 4-5 together. The line conductor 4-5 extends from the position of the via conductor 5-4 in a clockwise direction, and is connected via a second extended conductor 9 to the second external terminal electrode 7.

At an end portion of each of the line conductors 4-1 through 4-5 connected to a relevant one of the via conductors 5-1 through 5-4, a pad portion 10 is provided. The pad portion 10 normally has an area wider than the cross-sectional area of the via conductor 5-1 through 5-4 to ensure reliability of connection between each of the line conductors 4-1 through 4-5 and each of the via conductors 5-1 through 5-4. Also, each of the via conductors 5-1 through 5-4 has a circular section having a diameter larger than the line width of the line conductors 4-1 through 4-5.

For example, Japanese Unexamined Patent Application Publication No. 2018-184582 describes the inductor 1 in which the section of each of the via conductors 5-1 through 5-4 has a circular shape having a diameter larger than the line width of each of the line conductors 4-1 through 4-5 and the pad portion 10 has a shape which is wider than the cross-sectional area of each of the via conductors 5-1 through 5-4 and is concentric with the section of the respective via conductors 5-1 through 5-4.

SUMMARY

In actual use of the inductor 1 depicted in FIG. 32, in a region R surrounded by the helical orbit formed by the plurality of line conductors 4-1 through 4-5 being collected together, the magnetic flux passes so as to be orthogonal to the sheet of FIG. 32. Meanwhile, in the above-described region R, part of the via conductors 5-1 through 5-4 and, furthermore, part of the pad portions 10 are present as projecting from the inner peripheral side of the line conductors 4-1 through 4-5.

It has been revealed that, in such a state, the via conductors 5-1 through 5-4 and the pad portions 10 interrupt the magnetic flux, thereby affecting the characteristics of the inductor 1, in particular, the Q value.

Thus, the present disclosure provides an inductor which includes a component main body formed of a non-conductive material; and a coil arranged inside the component main body and having a plurality of line conductors each extending along a principal surface of the component main body and a plurality of via conductors each extending perpendicularly to the principal surface of the component main body. The coil has a helical orbit by the line conductors and the via conductors being connected together.

In the inductor, the plurality of via conductors include a curved via conductor in a long and curve shape extending along a first line conductor which is one of the line conductors and is connected to the curved via conductor.

In the inductor according to the above-described aspect, the via conductor can be made so that the degree of projecting to the inner peripheral side of the line conductor is decreased and so as to be prevented from projecting to the inner peripheral side of the line conductor. Therefore, interruption of the magnetic flux by the via conductor can be decreased or eliminated, and it is possible to inhibit the via conductor from affecting the characteristics of the inductor, in particular the Q value.

Also, in the inductor according to the above-described aspect, since the curved via conductor is included, it is possible to decrease the influence of variations in process in the laminating process for obtaining the component main body, the exposing process for forming the line conductors and the via conductors, and so forth. Therefore, reliability of connection between the line conductors and the via conductors can be improved.

DETAILED DESCRIPTION

With reference to FIG. 1 to FIG. 25, an inductor 11 according to a first embodiment of the present disclosure is described.

The inductor 11 includes a component main body 12. The component main body 12 is made of a non-conductive material including at least one type of, for example, glass, resin, and ferrite. Also, when the component main body 12 is formed of a molded body of resin or the like, the non-conductive material may contain a non-magnetic filler such as silica or a magnetic filler such as ferrite or a metal magnetic body. Furthermore, the non-magnetic material may have a structure with a plurality of these glass, ferrite, and resin combined together. The component main body 12 has a rectangular parallelepiped shape. The rectangular parallelepiped shape may be, for example, a shape with its edge portions and corner portions rounded or chamfered.

Figure 1:
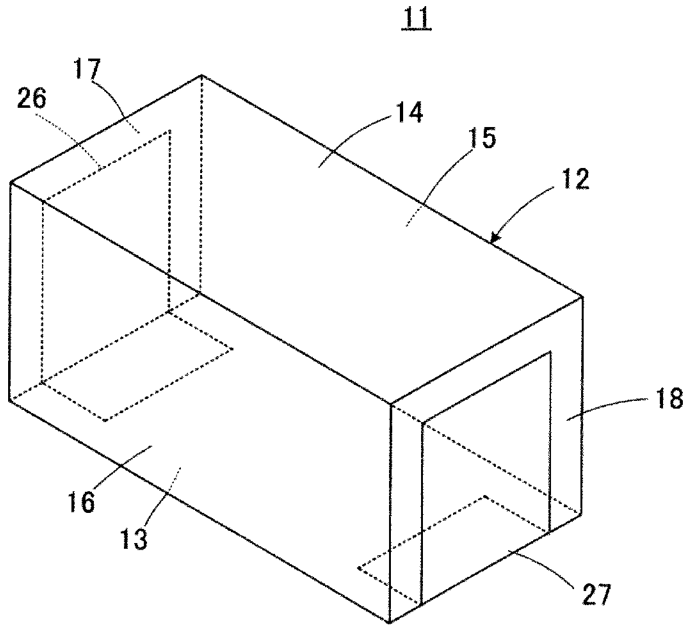
FIG. 1 is a perspective view illustrating an outer appearance of an inductor.

More specifically, as depicted in FIG. 1, the component main body 12 in a rectangular parallelepiped shape has a mount surface 13 oriented to a mount board side, a top surface 14 opposed to the mount surface 13, a first side surface 15 and a second side surface 16 coupling the mount surface 13 and the top surface 14 and opposed to each other, and a first end face 17 and a second end face 18 coupling the mount surface 13 and the top surface 14 and the first side surface 15 and the second side surface 16 and opposed to each other.

The component main body 12 has a multilayer structure with a plurality of non-conductive material layers 19 made of the above-described non-conductive material laminated together. The plurality of non-conductive material layers 19 are laminated from the first side surface 15 toward the second side surface 16. By a principal surface of the non-conductive material layer 19 positioned at each end portion in a laminating direction, each of the first side surface 15 and the second side surface 16 of the component main body 12 is provided. That is, each of the first side surface 15 and the second side surface 16 is one example of the principal surface of the component main body 12.

Figure 2:
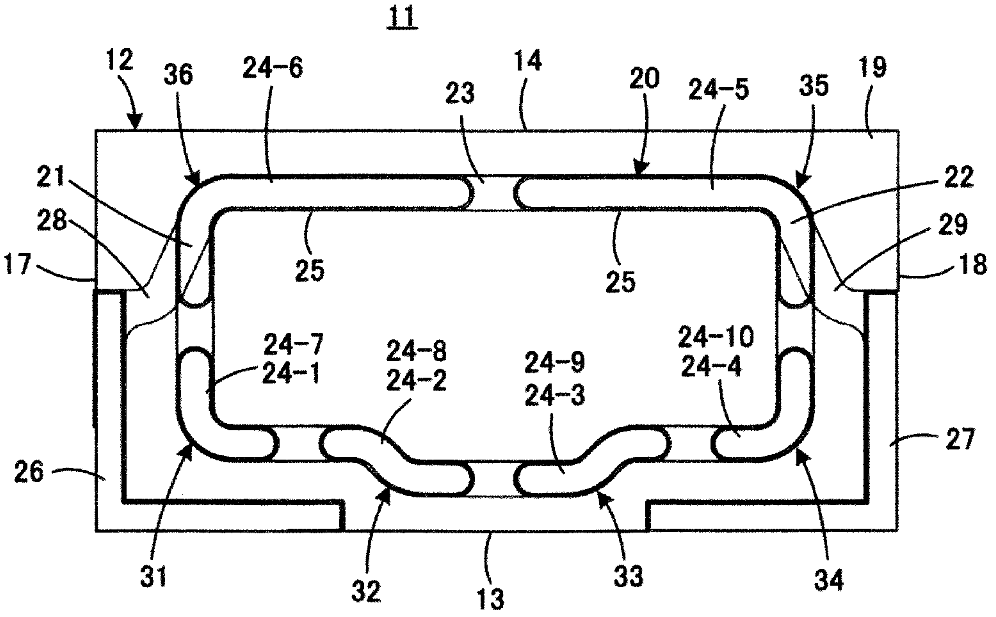
FIG. 2 is a transparent view of the inductor depicted in FIG. 1 along an axis-line direction of a coil.

Inside the component main body 12, as depicted in FIG. 2, a coil 20 is arranged. The coil 20 has a helical orbit. The axis line of the helical orbit of the coil 20 is oriented to a direction orthogonal to the side surfaces 15 and 16, that is, a direction parallel to the mount surface 13. That is, the axis-line direction of the coil 20 is parallel to the mount surface 13 and orthogonal to the first side surface 15 and the second side surface 16. The coil 20 includes a first end portion 21 and a second end portion 22 opposite to each other, and includes a plurality of line conductors 23 extending along any interface of the plurality of non-conductive material layers 19, that is, extending along the first side surface 15 and the second side surface 16, between the first end portion 21 and the second end portion 22, and a plurality of via conductors 21-1, 24-2, 24-3 . . . (referred to generally as via conductors 24, as shown, for example, in FIGS. 24A and 24B), penetrating through any of the non-conductive material layers 19 in a thickness direction, that is, extending perpendicularly to the first side surface 15 and the second side surface 16. The coil 20 has a helical orbit as a whole by the above-described line conductors 23 and via conductors 24 alternately connected together. The plurality of line conductors 23 each have, at its end portion, a pad portion 25 connected to a relevant one of the via conductors 24.

As depicted in FIG. 2, when transparently viewed in an axis-line direction of the coil 20, a direction orthogonal to the direction in which the line conductors 23 and the pad portions 25 extend is taken as a width direction of the line conductors 23 and the pad portions 25. In the present embodiment, the dimension of each line conductor 23 in the width direction is maintained to be taken as the dimension of each pad portion 25 in the width direction, and the dimension of each via conductor 24 in the width direction is set substantially equivalent to the dimension of each line conductor 23 in the width direction.

On the outer surface of the component main body 12, a first external terminal electrode 26 and a second external terminal electrode 27 respectively connected to a first end portion 21 and a second end portion 22 of the coil 20 are provided. The first external terminal electrode 26 and the second external terminal electrode 27 are each provided over two surfaces, that is, the mount surface 13 of the component main body 12 and its adjacent first end face 17 and second end face 18, respectively. If the first external terminal electrode 26 and the second external terminal electrode 27 are provided in the form described above, when the inductor 11 is mounted on the mount board, a solder fillet in an appropriate form can be formed. Thus, a mount state with high reliability can be obtained in view of both electrical connection and mechanical bonding. The first external terminal electrode 26 and the second external terminal electrode 27 are provided so as to penetrate, in the thickness direction, through the plurality of non-conductive material layers 19 except some non-conductive material layers 19 positioned at both end portions in the laminating direction.

The above-described coil 20 and external terminal electrodes 26 and 27 are each formed by patterning a conductive film formed of conductive paste containing, for example, silver, as a conductive component. Also, the non-conductive material layers 19 are each formed by patterning, as required, a non-conductive material film formed of paste containing a non-conductive material containing at least one type of, for example, glass, resin, and ferrite. For patterning the conductive film and the non-conductive material film, for example, photolithography, semi-additive process, screen printing, transfer printing, or the like is applied.

Although not depicted, a plating film may be formed on a portion of the external terminal electrodes 26 and 27 exposed from the component main body 12. The plating film includes, for example, a Ni plated layer and a Sn plated layer thereon.

The via conductors 24 include long via conductors in a long shape extending along the line conductors 23. In the present embodiment, all of the via conductors 24 depicted in the drawings are long via conductors. Also in the present embodiment, all of the long via conductors are curved via conductors extending with a curve, that is, in a curve shape.

Here, in reviewing a relation among "via conductor", "long via conductor", and "curved via conductor", "via conductor" is a superordinate concept of "long via conductor", and "long via conductor" is a superordinate concept of "curved via conductor". Therefore, when it comes to "curved via conductor", this is a "long via conductor" and, furthermore, a "via conductor". Also, when a conductor is a "long via conductor" but is not a "curved via conductor", this is called a "long via conductor".

With reference mainly to FIG. 3 to FIG. 23, connections of the plurality of line conductors 23 in the coil 20 are more specifically described.

To make the plurality of via conductors 24 distinguished from one another, numerals "-1", "-2", . . . are suffixed to the respective reference numerals of the via conductors 24. In FIG. 2, the curved via conductor 24-1, the curved via conductor 24-2, the curved via conductor 24-3, . . . are depicted as aligned in a counterclockwise direction.

Also, the plurality of line conductors 23 connected via the plurality of via conductors 24 are provided with reference numerals "23-1", "23-2", "23-3", . . . , respectively. The line conductors 23-1, 23-2, 23-3, . . . are each provided so as to extend along different interfaces between the non-conductive material layers 19. More specifically, the interface provided with the line conductor 23-1, the interface provided with the line conductor 23-2, the interface provided with the line conductor 23-3, . . . are aligned in this order in the laminating direction of the non-conductive material layers 19. Furthermore, the pad portions 25 provided by the end portions of the line conductors 23-1, 23-2, 23-3, . . . are provided with reference numerals "25-1", "25-2, "25-3", . . . , respectively.

Still further, the non-conductive material layers 19 having the line conductors 23-1, 23-2, 23-3, . . . , respectively, on their principal surfaces are provided with reference numerals "19-1", "19-2", "19-3", . . . , respectively. The non-conductive material layers 19-1, 19-2, 19-3, . . . are laminated in this order from bottom to top.

To the first end portion 21 and the second end portion 22 of the coil 20, a first extended conductor 28 and a second extended conductor 29 are connected, respectively. These first extended conductor 28 and second extended conductor 29 are provided by extended portions of the line conductors 23-1 and 23-11 which respectively position the first end portion 21 and the second end portion 22 of the coil 20.

Note that in the specification, "line conductor", "extended conductor", and "external terminal electrode" are defined and distinguished from one another as follows: "line conductor" refers to an orbital portion when transparently viewed in the axis-line direction of the coil; "extended conductor" refers to a portion extended out of the orbital portion; and "external terminal electrode" refers to a portion exposed from the component main body.

Figure 3:
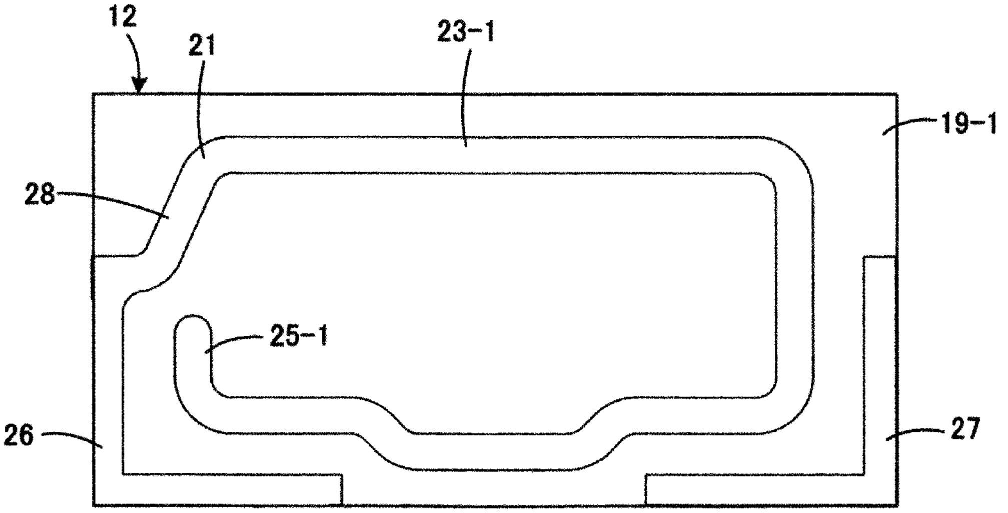
FIG. 3 depicts part of the inductor depicted in FIG. 2, and is a plan view depicting a non-conductive material layer provided with a line conductor which provides a first end portion of the coil.

First, as depicted in FIG. 3, on the non-conductive material layer 19-1, the line conductor 23-1 connected via the first extended conductor 28 to the first external terminal electrode 26 extends to the pad portion 25-1 in a clockwise direction.

Figure 4:
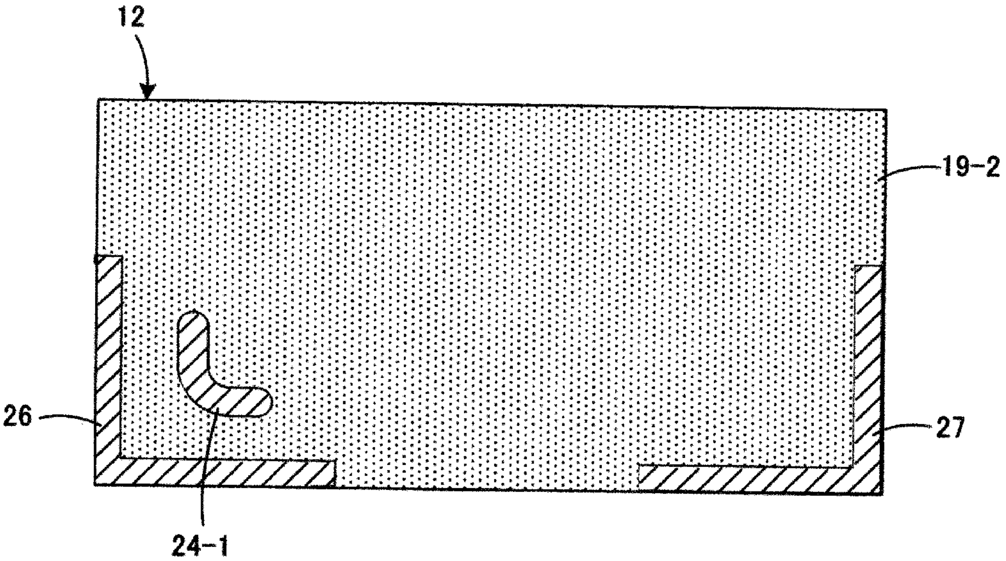
FIG. 4 depicts part of the inductor depicted in FIG. 2, and is a sectional view depicting a non-conductive material layer provided with a via conductor connected to the line conductor.

Next, the non-conductive material layer 19-2 depicted in FIG. 4 is laminated on the non-conductive material layer 19-1. The curved via conductor 24-1 is provided so as to penetrate through the non-conductive material layer 19-2. The curved via conductor 24-1 connects the line conductor 23-1 and the line conductor 23-2 depicted in FIG. 5 together via the pad portion 25-1.

Figure 5:
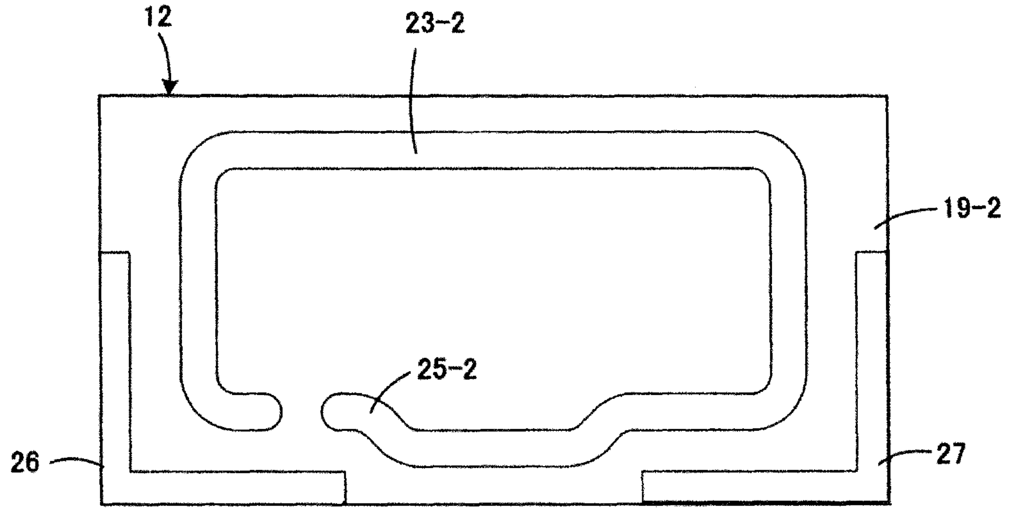
FIG. 5 depicts part of the inductor depicted in FIG. 2, and is a plan view depicting the non-conductive material layer provided with a line conductor connected to the via conductor.

Next, as depicted in FIG. 5, on the non-conductive material layer 19-2, the line conductor 23-2 extends from the position of the curved via conductor 24-1 to the pad portion 25-2 in a clockwise direction.

Figure 6:
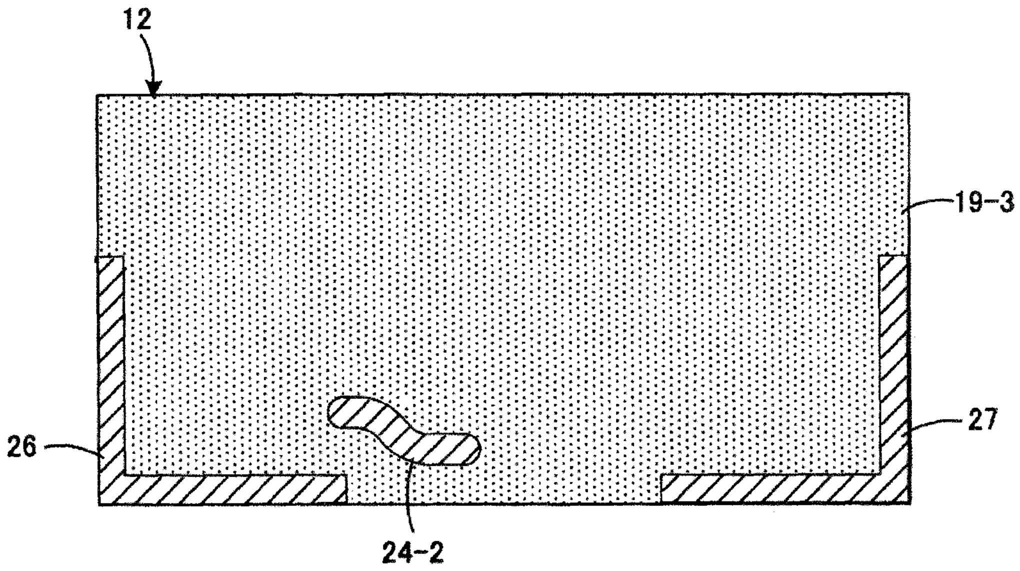
FIG. 6 depicts part of the inductor depicted in FIG. 2, and is a sectional view depicting a non-conductive material layer provided with a via conductor connected to the line conductor.

Next, the non-conductive material layer 19-3 depicted in FIG. 6 is laminated on the non-conductive material layer 19-2. The curved via conductor 24-2 is provided so as to penetrate through the non-conductive material layer 19-3. The curved via conductor 24-2 connects the line conductor 23-2 and the line conductor 23-3 depicted in FIG. 7 together via the pad portion 25-2.

Figure 7:
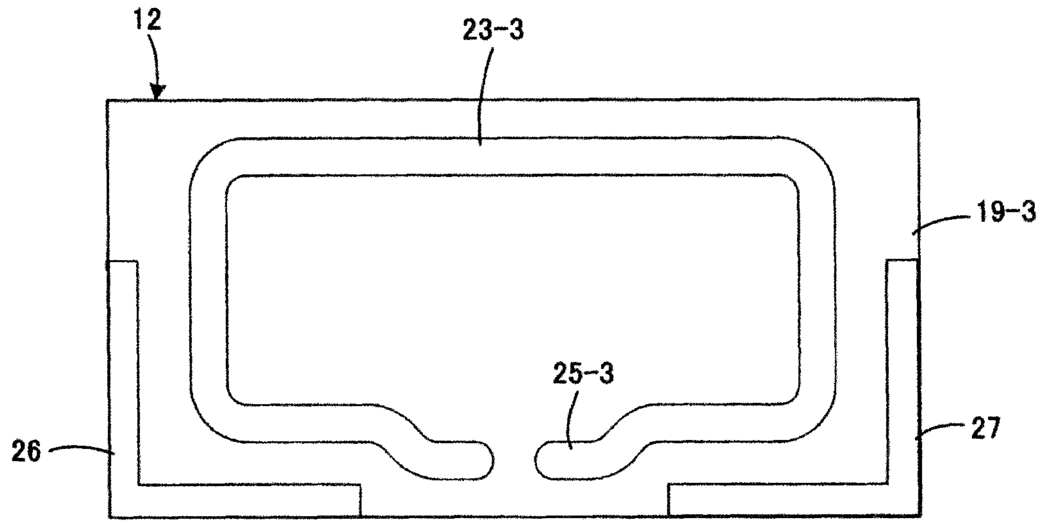
FIG. 7 depicts part of the inductor depicted in FIG. 2, and is a plan view depicting the non-conductive material layer provided with a line conductor connected to the via conductor.

Next, as depicted in FIG. 7, on the non-conductive material layer 19-3, the line conductor 23-3 extends from the position of the curved via conductor 24-2 to the pad portion 25-3 in a clockwise direction.

Figure 8:
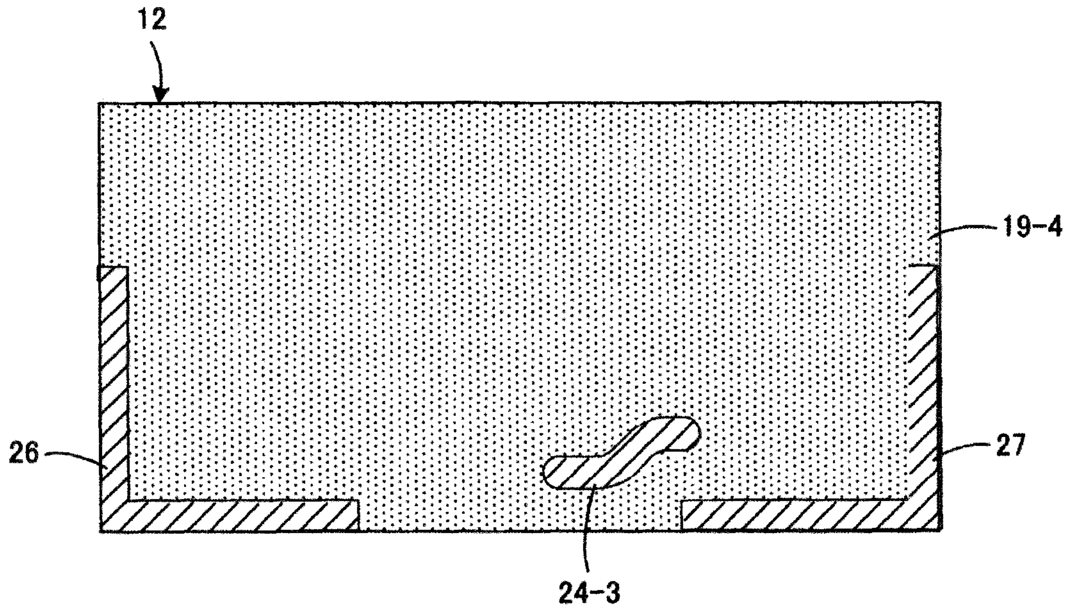
FIG. 8 depicts part of the inductor depicted in FIG. 2, and is a sectional view depicting a non-conductive material layer provided with a via conductor connected to the line conductor.

Next, the non-conductive material layer 19-4 depicted in FIG. 8 is laminated on the non-conductive material layer 19-3. The curved via conductor 24-3 is provided so as to penetrate through the non-conductive material layer 19-4. The curved via conductor 24-3 connects the line conductor 23-3 and the line conductor 23-4 depicted in FIG. 9 together via the pad portion 25-3.

Figure 9:
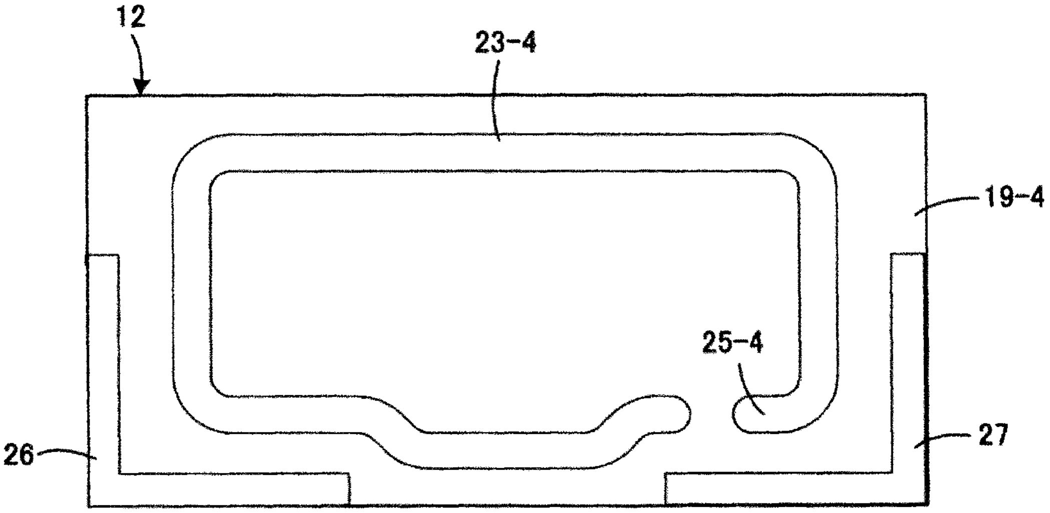
FIG. 9 depicts part of the inductor depicted in FIG. 2, and is a plan view depicting the non-conductive material layer provided with a line conductor connected to the via conductor.

Next, as depicted in FIG. 9, on the non-conductive material layer 19-4, the line conductor 23-4 extends from the position of the curved via conductor 24-3 to the pad portion 25-4 in a clockwise direction.

Figure 10:
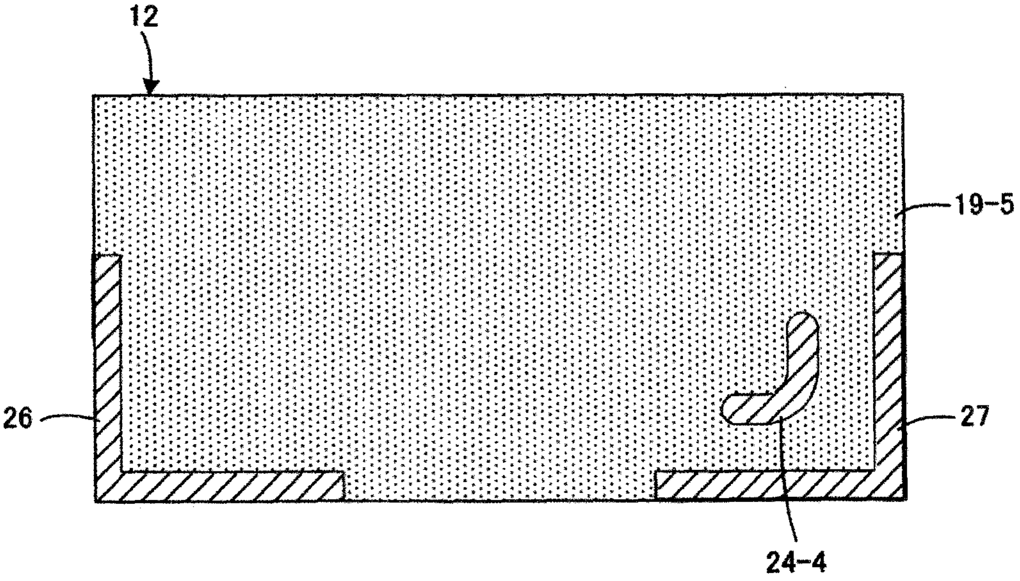
FIG. 10 depicts part of the inductor depicted in FIG. 2, and is a sectional view depicting a non-conductive material layer provided with a via conductor connected to the line conductor.

Next, the non-conductive material layer 19-5 depicted in FIG. 10 is laminated on the non-conductive material layer 19-4. The curved via conductor 24-4 is provided so as to penetrate through the non-conductive material layer 19-5. The curved via conductor 24-4 connects the line conductor 23-4 and the line conductor 23-5 depicted in FIG. 11 together via the pad portion 25-4.

Figure 11:
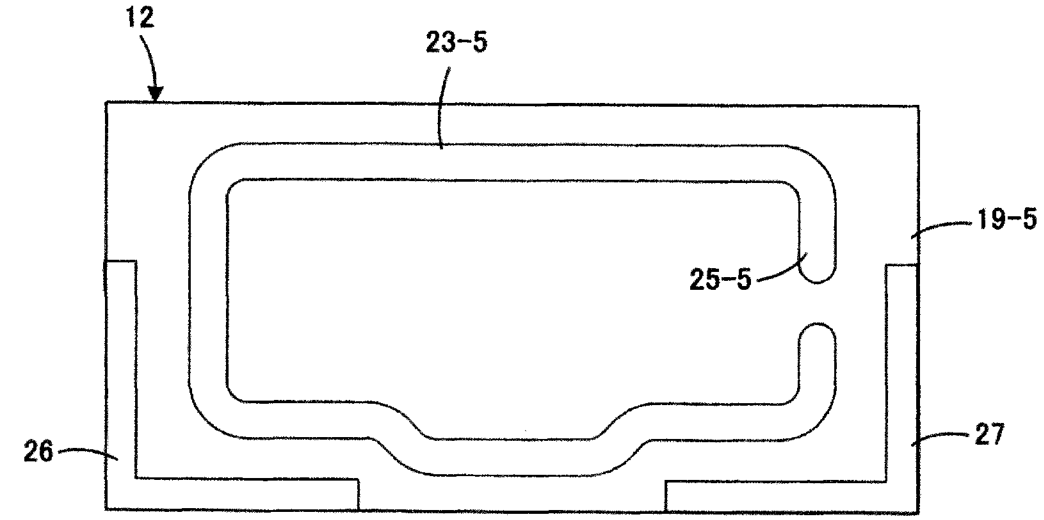
FIG. 11 depicts part of the inductor depicted in FIG. 2, and is a plan view depicting the non-conductive material layer provided with a line conductor connected to the via conductor.

Next, as depicted in FIG. 11, on the non-conductive material layer 19-5, the line conductor 23-5 extends from the position of the curved via conductor 24-4 to the pad portion 25-5 in a clockwise direction.

Figure 12:
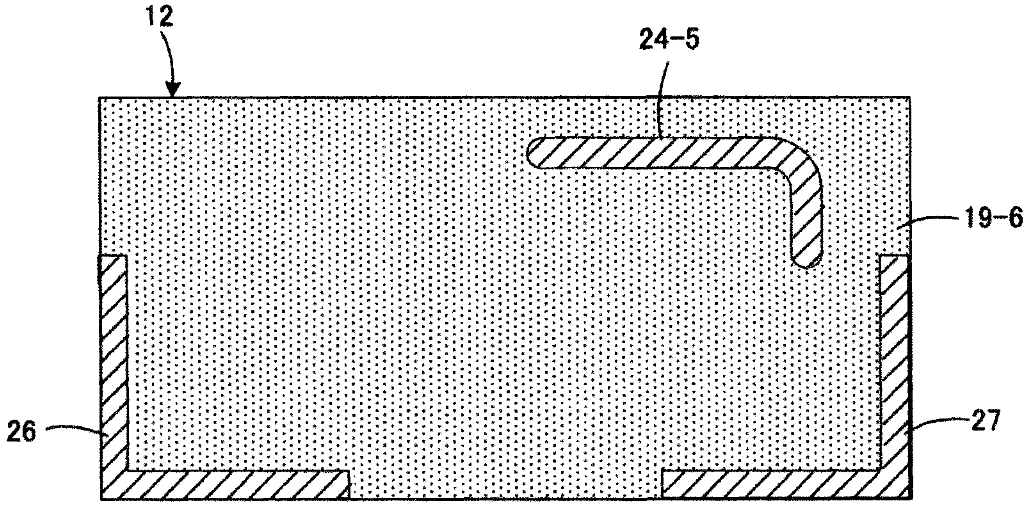
FIG. 12 depicts part of the inductor depicted in FIG. 2, and is a sectional view depicting a non-conductive material layer provided with a via conductor connected to the line conductor.

Next, the non-conductive material layer 19-6 depicted in FIG. 12 is laminated on the non-conductive material layer 19-5. The curved via conductor 24-5 is provided so as to penetrate through the non-conductive material layer 19-6. The curved via conductor 24-5 connects the line conductor 23-5 and the line conductor 23-6 depicted in FIG. 13 together via the pad portion 25-5.

Figure 13:
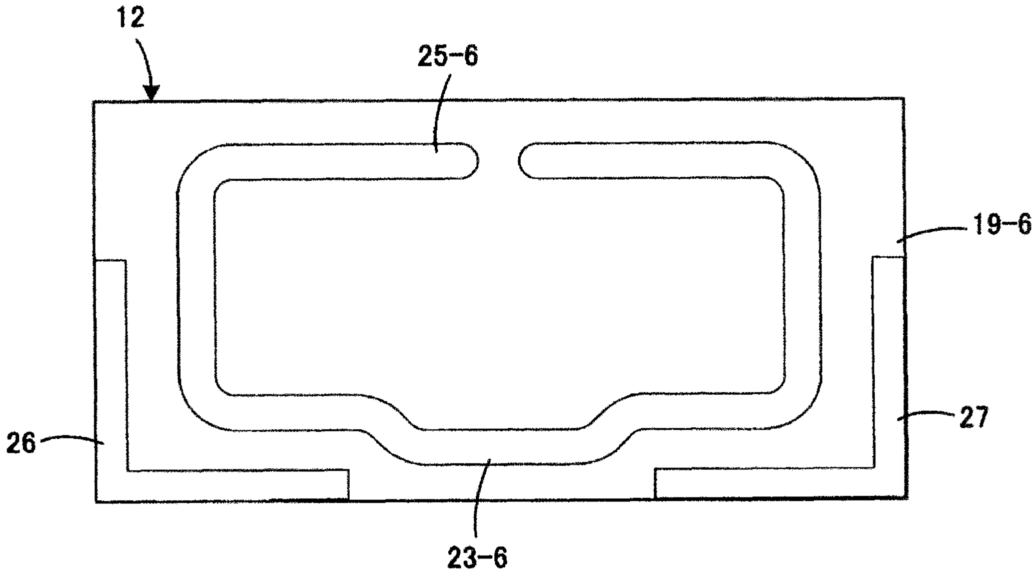
FIG. 13 depicts part of the inductor depicted in FIG. 2, and is a plan view depicting the non-conductive material layer provided with a line conductor connected to the via conductor.

Next, as depicted in FIG. 13, on the non-conductive material layer 19-6, the line conductor 23-6 extends from the position of the curved via conductor 24-5 to the pad portion 25-6 in a clockwise direction.

Figure 14:
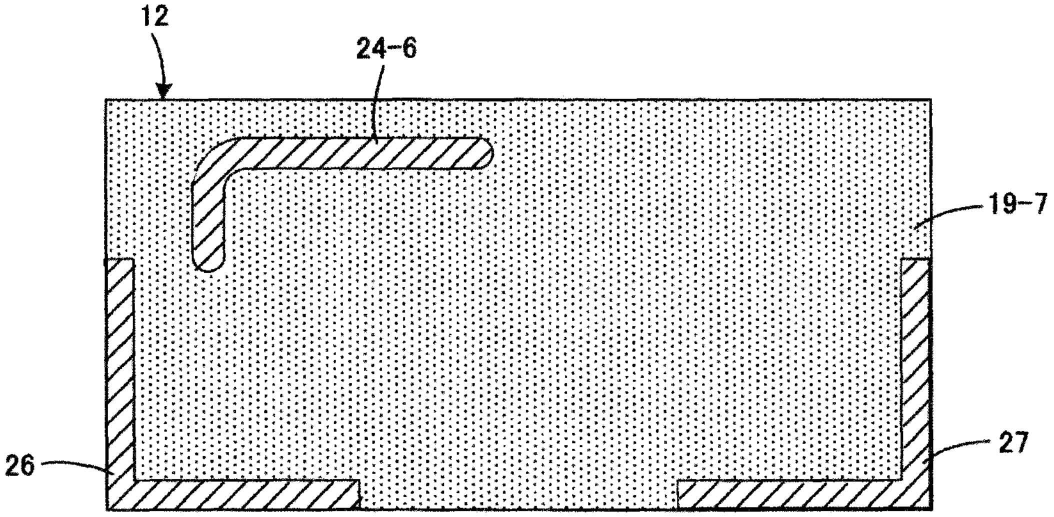
FIG. 14 depicts part of the inductor depicted in FIG. 2, and is a sectional view depicting a non-conductive material layer provided with a via conductor connected to the line conductor.

Next, the non-conductive material layer 19-7 depicted in FIG. 14 is laminated on the non-conductive material layer 19-6. The curved via conductor 24-6 is provided so as to penetrate through the non-conductive material layer 19-7. The curved via conductor 24-6 connects the line conductor 23-6 and the line conductor 23-7 depicted in FIG. 15 together via the pad portion 25-6.

Figure 15:
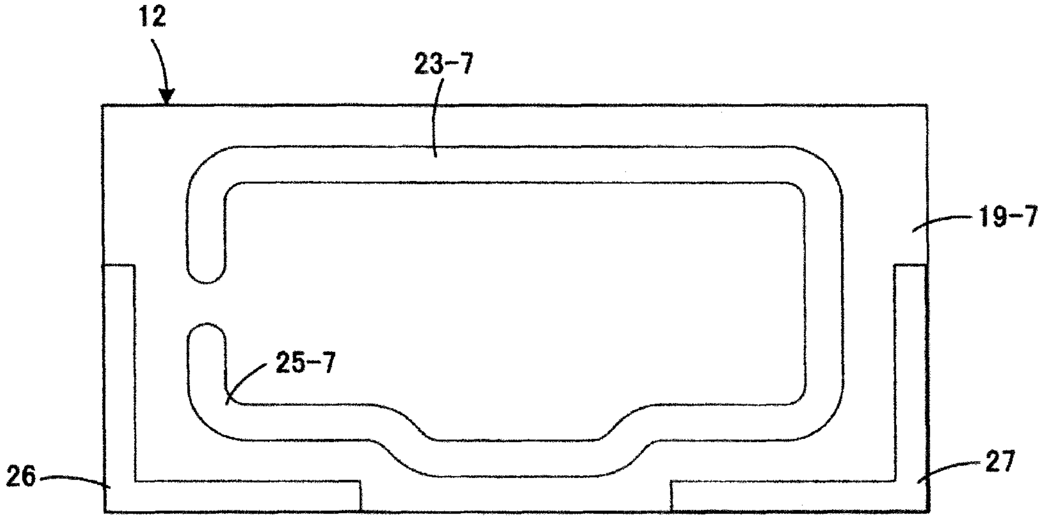
FIG. 15 depicts part of the inductor depicted in FIG. 2, and is a plan view depicting the non-conductive material layer provided with a line conductor connected to the via conductor.

Next, as depicted in FIG. 15, on the non-conductive material layer 19-7, the line conductor 23-7 extends from the position of the curved via conductor 24-6 to the pad portion 25-7 in a clockwise direction.

Figure 16:
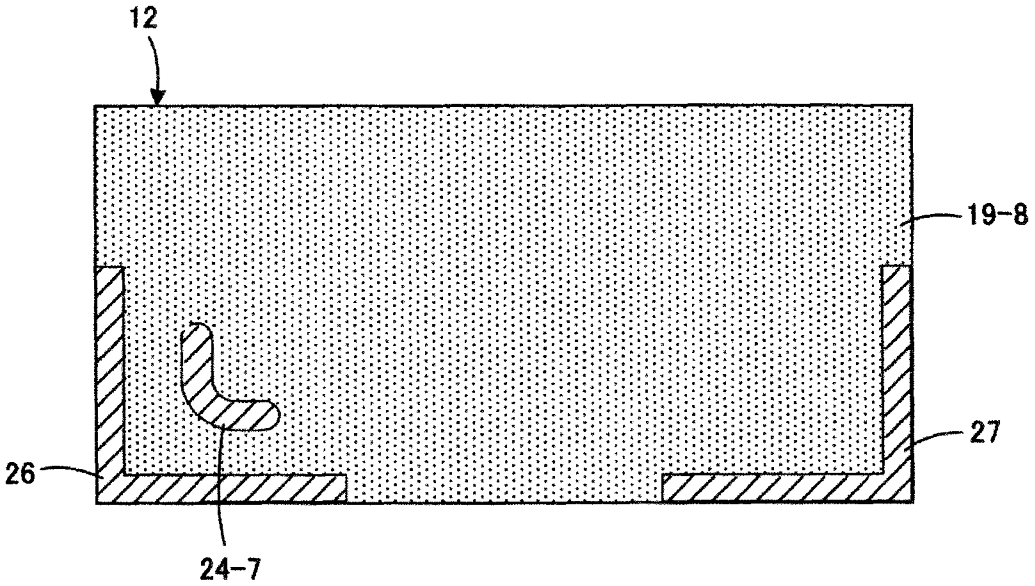
FIG. 16 depicts part of the inductor depicted in FIG. 2, and is a sectional view depicting a non-conductive material layer provided with a via conductor connected to the line conductor.

Next, the non-conductive material layer 19-8 depicted in FIG. 16 is laminated on the non-conductive material layer 19-7. The curved via conductor 24-7 is provided so as to penetrate through the non-conductive material layer 19-8. The curved via conductor 24-7 connects the line conductor 23-7 and the line conductor 23-8 depicted in FIG. 17 together via the pad portion 25-7.

Figure 17:
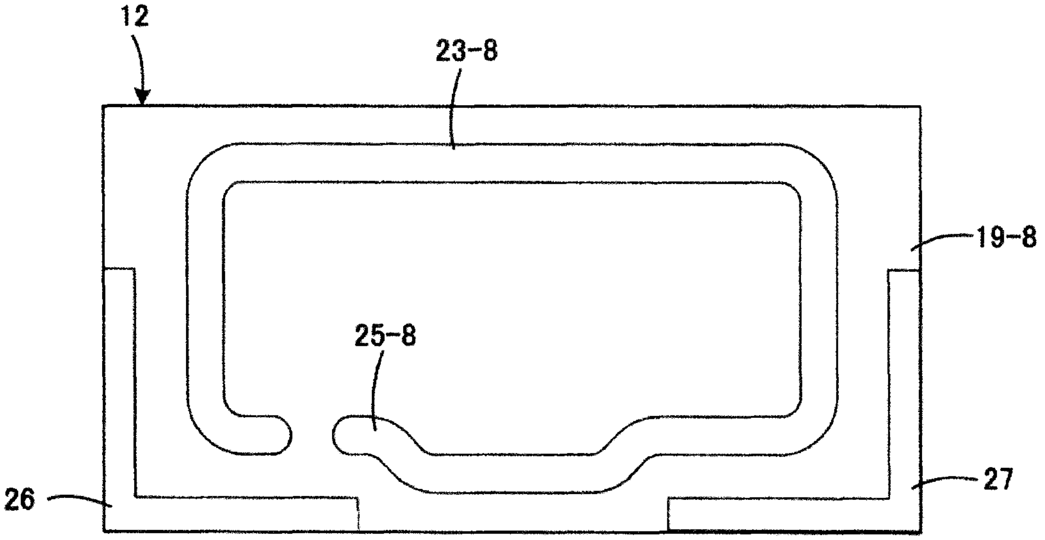
FIG. 17 depicts part of the inductor depicted in FIG. 2, and is a plan view depicting the non-conductive material layer provided with a line conductor connected to the via conductor.

Next, as depicted in FIG. 17, on the non-conductive material layer 19-8, the line conductor 23-8 extends from the position of the curved via conductor 24-7 to the pad portion 25-8 in a clockwise direction.

Figure 18:
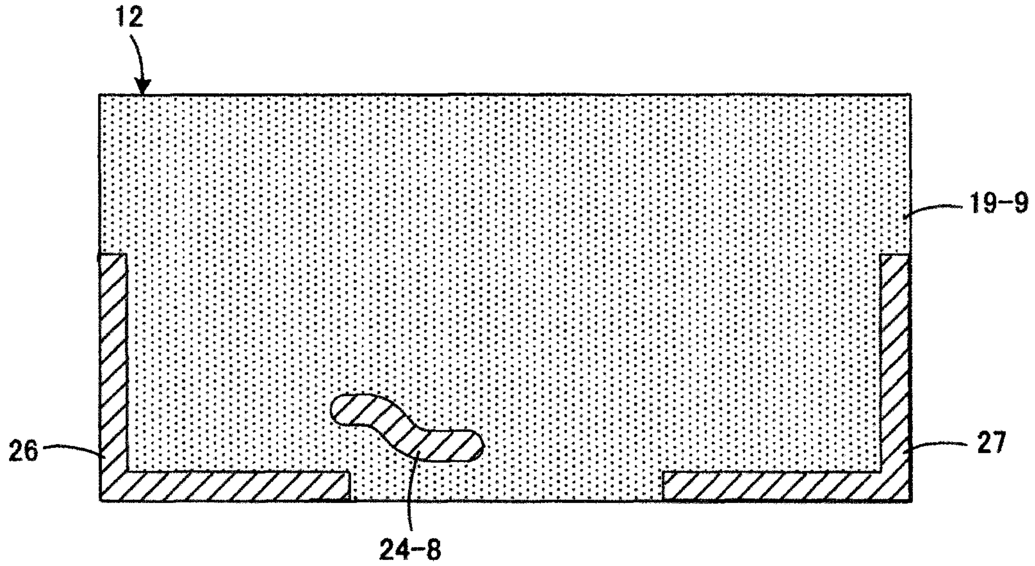
FIG. 18 depicts part of the inductor depicted in FIG. 2, and is a sectional view depicting a non-conductive material layer provided with a via conductor connected to the line conductor.

Next, the non-conductive material layer 19-9 depicted in FIG. 18 is laminated on the non-conductive material layer 19-8. The curved via conductor 24-8 is provided so as to penetrate through the non-conductive material layer 19-9. The curved via conductor 24-8 connects the line conductor 23-8 and the line conductor 23-9 depicted in FIG. 19 together via the pad portion 25-8.

Figure 19:
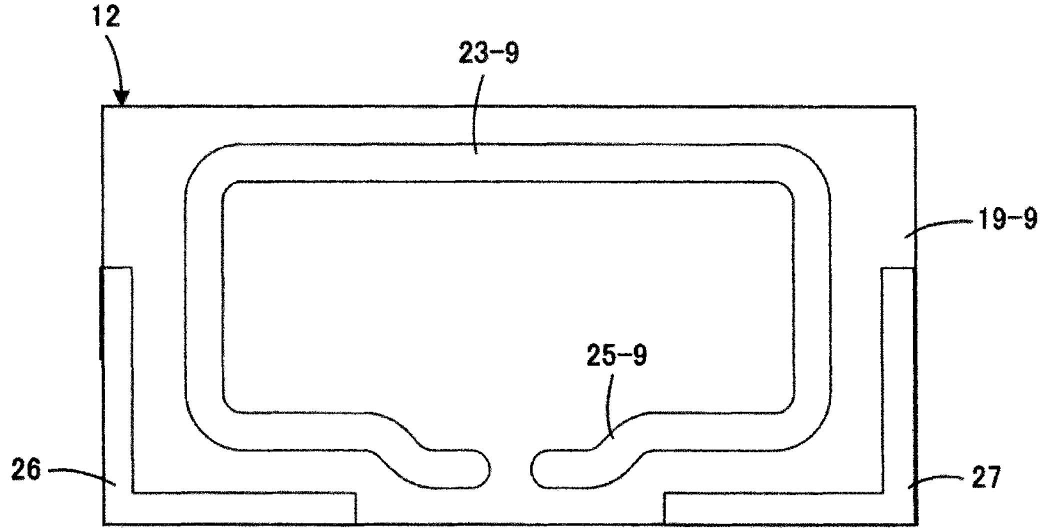
FIG. 19 depicts part of the inductor depicted in FIG. 2, and is a plan view depicting the non-conductive material layer provided with a line conductor connected to the via conductor.

Next, as depicted in FIG. 19, on the non-conductive material layer 19-9, the line conductor 23-9 extends from the position of the curved via conductor 24-8 to the pad portion 25-9 in a clockwise direction.

Figure 20:
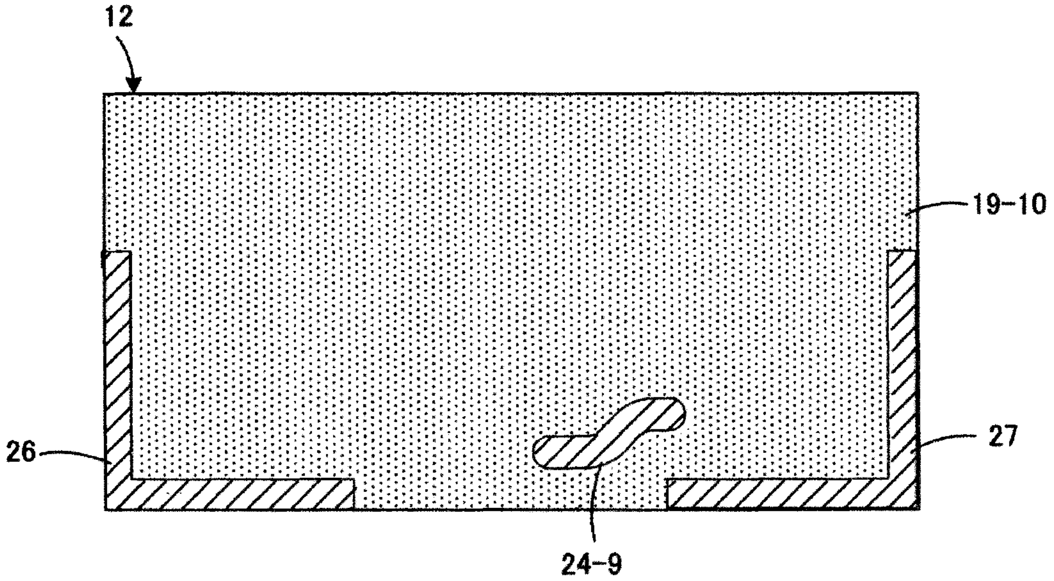
FIG. 20 depicts part of the inductor depicted in FIG. 2, and is a sectional view depicting a non-conductive material layer provided with a via conductor connected to the line conductor.

Next, the non-conductive material layer 19-10 depicted in FIG. 20 is laminated on the non-conductive material layer 19-9. The curved via conductor 24-9 is provided so as to penetrate through the non-conductive material layer 19-10. The curved via conductor 24-9 connects the line conductor 23-9 and the line conductor 23-10 depicted in FIG. 21 together via the pad portion 25-9.

Figure 21:
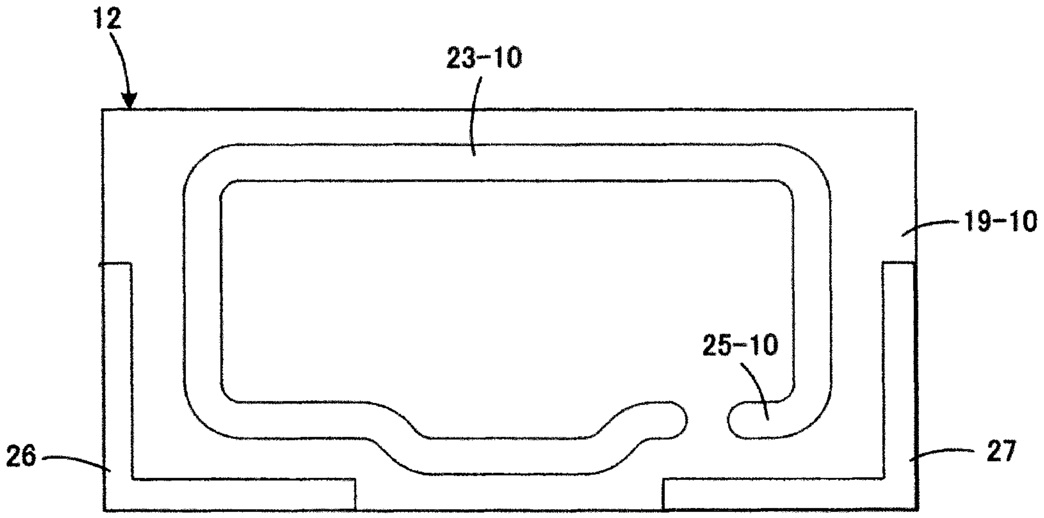
FIG. 21 depicts part of the inductor depicted in FIG. 2, and is a plan view depicting the non-conductive material layer provided with a line conductor connected to the via conductor.

Next, as depicted in FIG. 21, on the non-conductive material layer 19-10, the line conductor 23-10 extends from the position of the curved via conductor 24-9 to the pad portion 25-10 in a clockwise direction.

Figure 22:
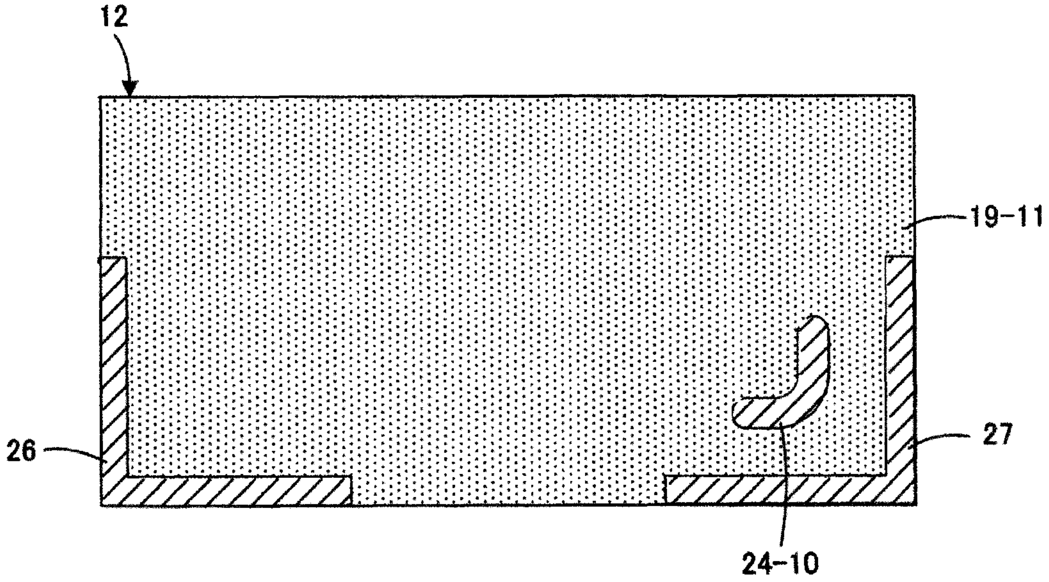
FIG. 22 depicts part of the inductor depicted in FIG. 2, and is a sectional view depicting a non-conductive material layer provided with a via conductor connected to the line conductor.

Next, the non-conductive material layer 19-11 depicted in FIG. 22 is laminated on the non-conductive material layer 19-10. The curved via conductor 24-10 is provided so as to penetrate through the non-conductive material layer 19-11. The curved via conductor 24-10 connects the line conductor 23-10 and the line conductor 23-11 depicted in FIG. 23 together via the pad portion 25-10.

Figure 23:
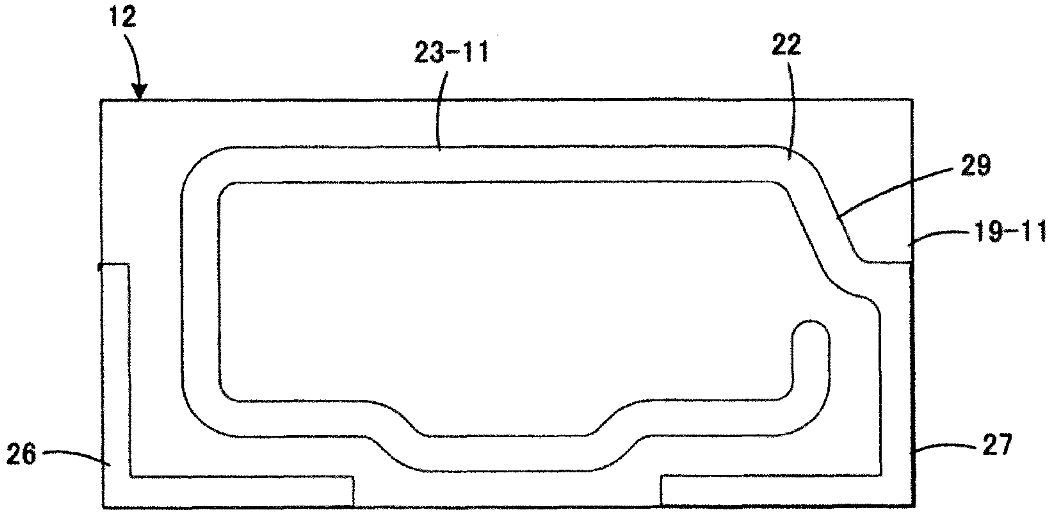
FIG. 23 depicts part of the inductor depicted in FIG. 2, and is a plan view depicting a non-conductive material layer provided with a line conductor which is connected to the via conductor and provides a second end portion of the coil.

Next, as depicted in FIG. 23, on the non-conductive material layer 19-11, the line conductor 23-11 extends from the position of the curved via conductor 24-10 in a clockwise direction and is connected via the second extended conductor 29 to the second external terminal electrode 27.

As described above, according to the first embodiment, since the via conductor 24 has a long shape, when transparently viewed in the axis-line direction of the coil 20, the via conductor 24 can be easily prevented from projecting to the inner peripheral side of the line conductor 23. Therefore, a concern of occurrence of an interruption of the magnetic flux by the via conductor 24 is decreased, and it is possible to inhibit the via conductor 24 from affecting the characteristics of the inductor, in particular, the Q value.

Also, since the via conductor 24 has a long shape extending with a curve, it is possible to decrease the influence of variations in process in the laminating process for obtaining the component main body 12, the exposing process for forming the line conductors 23 and the via conductors 24, and so forth. Therefore, reliability of connection between the line conductors 23 and the via conductors 24 can be improved. This is more specifically described below with reference to FIGS. 24A and 24B.

Figure 24A:
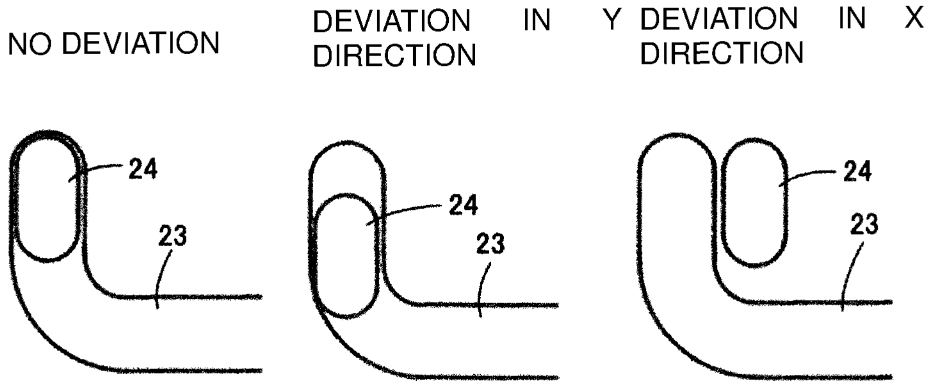
FIGS. 24A and 24B are diagrams schematically depicting the state of deviation between the line conductor and the via conductor by making a comparison between a case shown in FIG. 24A in which the via conductor extends without a curve and a case shown in FIG. 24B in which the via conductor extends with a curve.
Figure 24B:
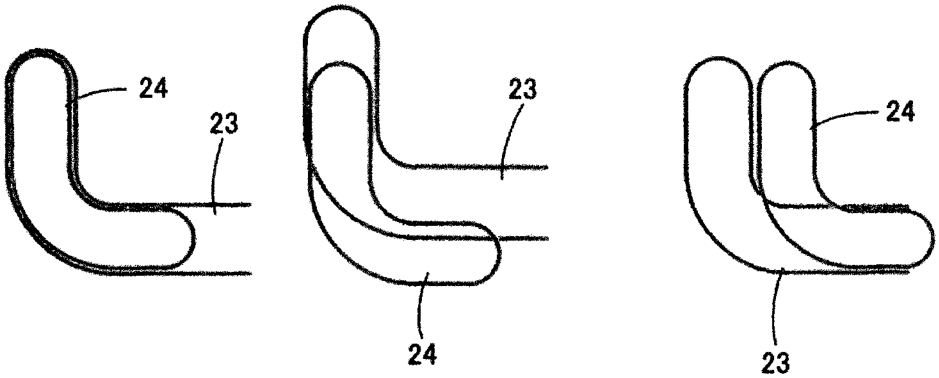

FIGS. 24A and 24B are diagrams schematically depicting the state of deviation between the line conductor 23 and the via conductor 24 by making a comparison between a case shown in FIG. 24A in which the via conductor 24 extends without a curve and a case shown in FIG. 24B in which the via conductor 24 extends with a curve. In FIGS. 24A and 24B, "deviation in Y direction" refers to a deviation in a longitudinal direction of the via conductor 24 extending without a curve, and "deviation in X direction" refers to a deviation in a width direction of the via conductor 24 extending without a curve.

Firstly, when the via conductor 24 extends without a curve as depicted in FIG. 24A, in the case of "no deviation" and "deviation in Y direction", the line conductor 23 and the via conductor 24 make contact with each other in the entire area of the via conductor 24, and the connection state is maintained. However, in the case of "deviation in X direction", the line conductor 23 and the via conductor 24 are separated from each other, and the connection state is not maintained. Note that if "deviation in X direction" is relatively small, the line conductor 23 and the via conductor 24 may make contact with each other at part of the via conductor 24, but it is difficult to say that the connection state has high reliability. In any case, it can be found that the influence given to the connection state by "deviation in X direction", which is a deviation of the via conductor 24 in the width direction, is large.

On the other hand, when the via conductor 24 extends with a curve as depicted in FIG. 24B, in the case of "no deviation", as a matter of course, the line conductor 23 and the via conductor 24 make contact with each other over the entire region of the via conductor 24. Next, in the case of "deviation in Y direction", the entire region of a portion of the curved via conductor 24 extending along the Y direction makes contact with the line conductor 23. In the case of "deviation in X direction", the entire region of a portion of the curved via conductor 24 extending along the X direction makes contact with the line conductor 23. Therefore, when the curved via conductor 24 is viewed as a whole, mutual contact between the line conductor 23 and the via conductor 24 can be ensured, and the highly-reliable connection state is maintained.

Note that since the curved via conductor 24 depicted in FIGS. 24A and 24B has a curve angle of 90 degrees (corresponding to angles θ1 and θ2 depicted in FIG. 25 described further below), the highly-reliable connection state can be maintained for both deviations in two directions, that is, "deviation in X direction" and "deviation in Y direction". However, the curved via conductor can exert the effect of maintaining the connection state with respect to "deviation" even if the curve angle is any other than 90 degrees. That is, in general, the highly-reliable connection state can be maintained for both deviations in two directions along both sides via the curved portion of the curved via conductor.

From these, if the via conductor 24 has a long shape extending with a curve, it is possible to decrease the influence of variations in process in the laminating process, the exposing process, and so forth, and reliability of connection between the line conductors 23 and the via conductors 24 can be improved.

Note that the long via conductor including the curved via conductor extending with a curve has a long shape extending along the line conductor. From a different point of view, the line conductor in contact with the curved via conductor also extends with a curve at a portion in contact with the curved via conductor. Therefore, the curved via conductor has an advantage of easily increasing the area of contact with the line conductor extending with a curve.

In the first embodiment, as depicted in FIG. 2, the helical orbit formed by the plurality of connections of the line conductors 23 has corner portions 31, 32, 33, 34, 35, and 36 each forming a corner, and the curved via conductors 24 are positioned at these corner portions 31 to 36, respectively. According to this structure, the cross-sectional areas of the corner portions 31 to 36 where currents tend to concentrate can be increased by the via conductors 24, current concentration is mitigated, and loss due to current concentration can be inhibited.

Figure 25:
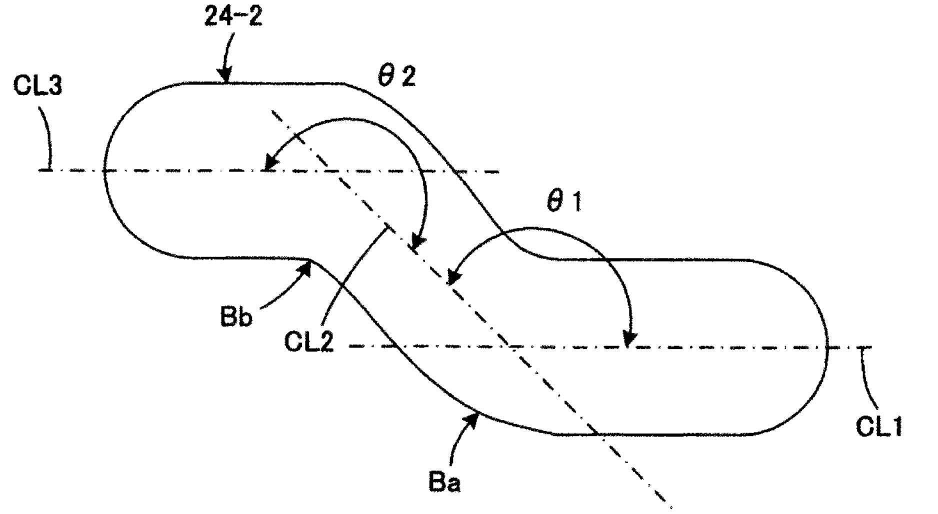
FIG. 25 is a diagram describing a curve angle of a curved via conductor.

Also, for each of the curved via conductors 24, the curve angle is discussed. The curve angle of the curved via conductor is defined as an angle at which lines connecting the centers of the curved via conductor in the width direction cross, the angle being measured from the inner peripheral side of the coil. With reference to FIG. 25, description is made more specifically. A curved via conductor depicted in FIG. 25 corresponds to, for example, the curved via conductor 24-2 depicted in FIG. 6. The curved via conductor 24-2 has two curved portions Ba and Bb. On the curved via conductor 24-2, as its lines connecting the centers in the width direction, a line CL1, a line CL2, and a line CL3 can be drawn. As curve angles of the curved via conductor 24-2, there are an angle θ1 formed by the line CL1 and the line CL2 and an angle θ2 formed by the line CL2 and the line CL3.

The above-described θ1 is larger than or equal to 90 degrees and smaller than 180 degrees (i.e., from 90 degrees to smaller than 180 degrees. The curved via conductor with this curve angle θ1 contributes to an increase in the cross-sectional area at the corner portion where current in the coil tends to concentrate. Thus, current concentration can be mitigated, and loss can be inhibited.

On the other hand, θ2 exceeds 180 degrees and smaller than or equal to 270 degrees (i.e., from exceeding 180 degrees to 270 degrees). The via conductor with this large curve angle can suppress occurrence of loss due to signal reflection.

The curved via conductor 24-1 depicted in FIG. 4, the curved via conductor 24-4 depicted in FIG. 10, the curved via conductor 24-5 depicted in FIG. 12, the curved via conductor 24-6 depicted in FIG. 14, the curved via conductor 24-7 depicted in FIG. 16, and the curved via conductor 24-10 depicted in FIG. 22 each have a curved portion with the curve angle θ1 larger than or equal to 90 degrees and smaller than 180 degrees (i.e., from 90 degrees to smaller than 180 degrees).

On the other hand, the curved via conductor 24-2 depicted in FIG. 6, the curved via conductor 24-3 depicted in FIG. 8, the curved via conductor 24-8 depicted in FIG. 18, and the curved via conductor 24-9 depicted in FIG. 20 each have both the curved portion Ba with the curve angle θ1 larger than or equal to 90 degrees and smaller than 180 degrees (i.e., from 90 degrees to smaller than 180 degrees) and the curved portion Bb with the curve angle θ2 exceeding 180 degrees and smaller than or equal to 270 degrees (i.e., from exceeding 180 degrees to 270 degrees). In the curved via conductors having two curved portions Ba and Bb as described above, the effect of inhibiting loss is more enhanced, compared with the curved via conductors having one curved portion.

Also, the above-described embodiment has a feature in which the number of turns of the line conductor 23 in the same interface between the non-conductive material layers 19 is larger than or equal to 0.7 turns and smaller than 2 turns (i.e., from 0.7 turns to smaller than 2 turns). If the above-described number of turns is 0.7 turns and larger, leakage of the magnetic flux can be decreased. If the above-described number of turns is smaller than 2 turns, a wide area of passage of the magnetic flux can be ensured.

Note that, as for the above-described number of turns, one turn is defined as follows. A tangent is sequentially drawn from the leading edge to the trailing edge of the line conductor 23 along the outer periphery of the line conductor 23, and one turn is defined at a stage in which this tangent is rotated at 360 degrees.

The above-described effects by the curved via conductors 24 obtained in the first embodiment are exerted also by a second embodiment onward described below.

Figure 26:
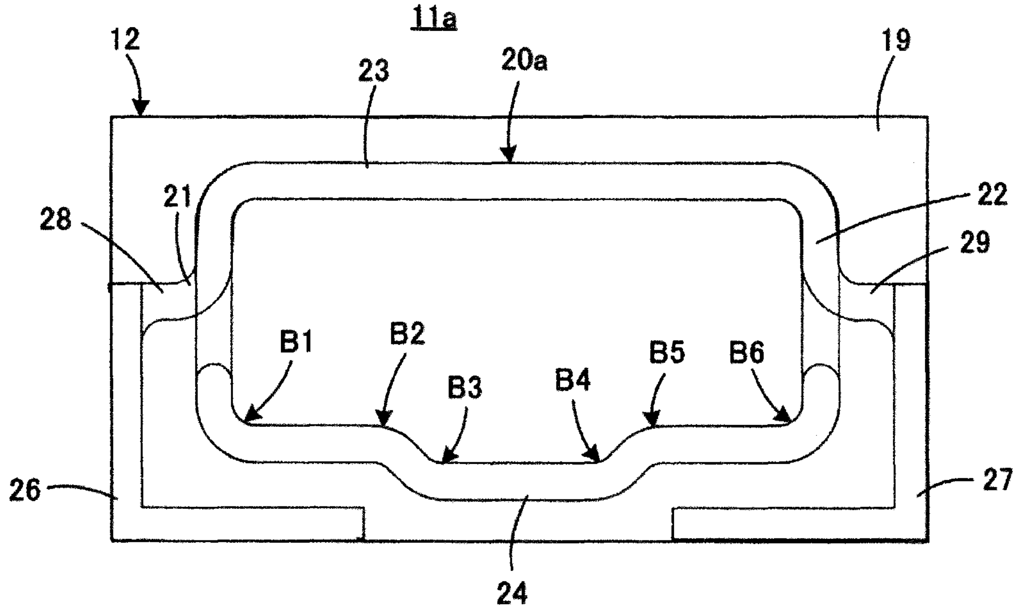
FIG. 26 is a view depicting an inductor, corresponding to FIG. 2.

Next, with reference to FIG. 26, an inductor 11*a* according to the second embodiment of the present disclosure is described. FIG. 26 is a view corresponding to FIG. 2. In FIG. 26, components corresponding to components depicted in FIG. 2 are provided with the same reference numeral and redundant description is omitted.

As described above, in the curved via conductor having two curved portions, the effect of inhibiting loss is more enhanced, compared with the curved via conductor having one curved portion. In the inductor 11*a* depicted in FIG. 26, the curved via conductor 24 in a long shape extending along the line conductor 23 in a coil 20*a* has six curved portions B1 to B6. Therefore, the effect of inhibiting loss is more enhanced.

Figure 27:
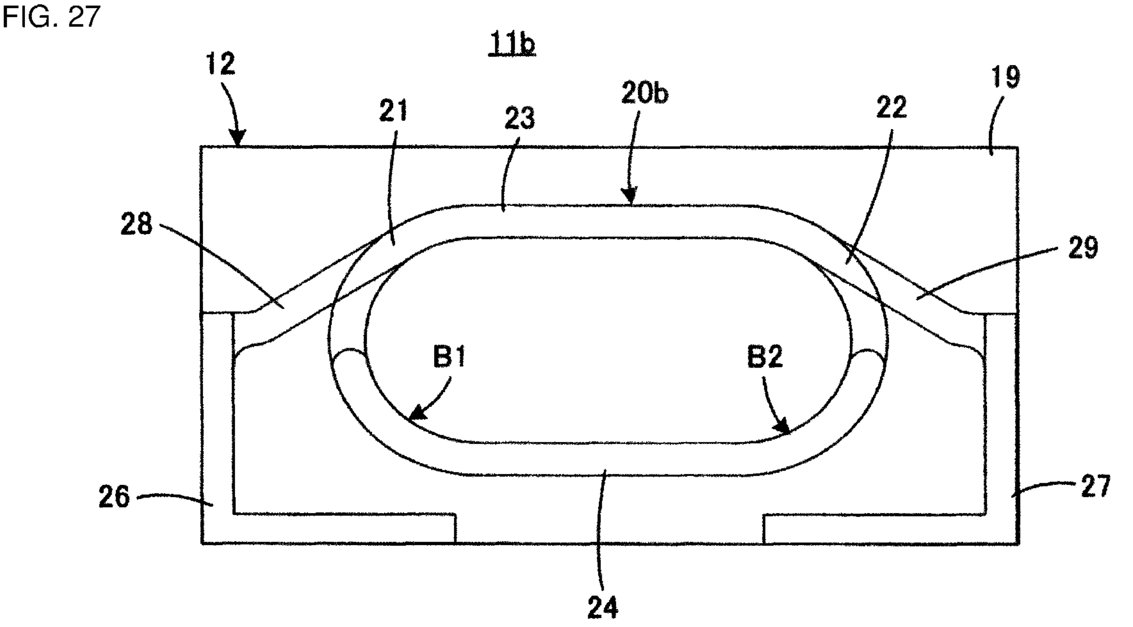
FIG. 27 is a view depicting an inductor, corresponding to FIG. 2.

Next, with reference to FIG. 27, an inductor 11*b* according to a third embodiment of the present disclosure is described. FIG. 27 is a view corresponding to FIG. 2. In FIG. 27, components corresponding to components depicted in FIG. 2 are provided with the same reference numeral and redundant description is omitted.

In the inductor 11*b* depicted in FIG. 27, the curved via conductor 24 in a long shape extending along the line conductor 23 in a coil 20*b* has two curved portions B1 and B2. Also, while the curved portions of the curved via conductor 24 depicted in FIG. 26 and its preceding drawings each have a rather bent curve, the curved portions B1 and B2 of the curved via conductor 24 depicted in FIG. 27 each have a rather bowed curve. From this, "curved" should be understood as having a wide range of meanings from "bent" to "bowed".

Note that the mode of the coil 20*b* depicted in FIG. 27 is different from the mode of the coil 20 depicted in FIG. 2 and others. This indicates that, firstly, the coil can take any of various modes. Also, since the coil 20*b* depicted in FIG. 27 has a simple oval shape when transparently viewed in the axis-line direction, asperities can be decreased on the inner peripheral edge side. Therefore, loss due to current concentration or the like can be inhibited.

Figure 28:
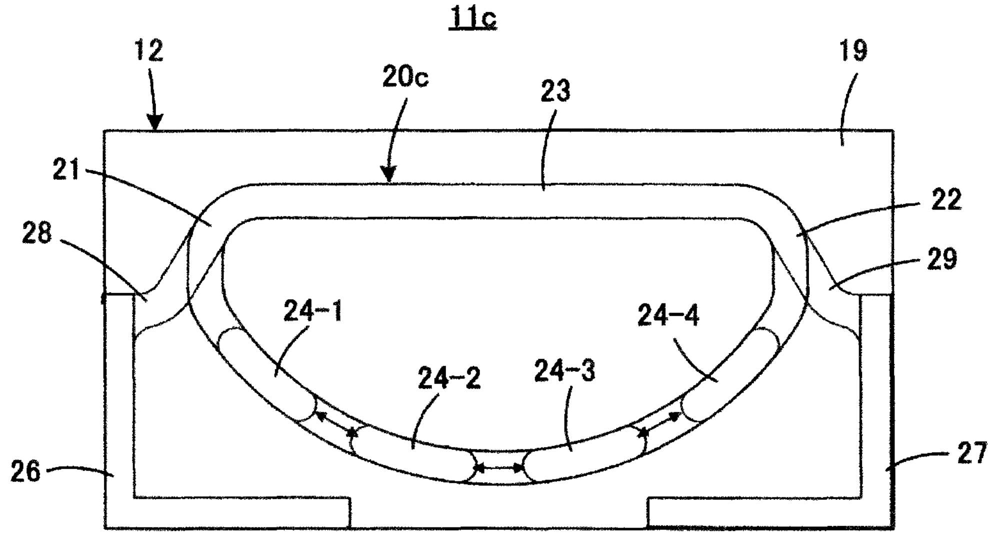
FIG. 28 is a view depicting an inductor, corresponding to FIG. 2.

Next, with reference to FIG. 28, an inductor 11*c* according to a fourth embodiment of the present disclosure is described. FIG. 28 is a view corresponding to FIG. 2. In FIG. 28, components corresponding to components depicted in FIG. 2 are provided with the same reference numeral and redundant description is omitted.

In a coil 20*c* included in the inductor 11*c* depicted in FIG. 28, the number of turns of the line conductor 23 in the same interface between the non-conductive material layers 19 is smaller than one turn, and the line conductors 23 each along interface between the non-conductive material layers 19 have a constant number of turns. According to this structure, as can be seen from FIG. 28, each space among the curved via conductors 24-1, 24-2, 24-3, and 24-4 is equal, a bottleneck due to the cross-sectional area in a current route provided by the coil 20*c* can be eliminated, and occurrence of loss due to current concentration or the like can be suppressed.

The first to fourth embodiments described above commonly have a feature in which the dimension of the line conductor 23 in the width direction in the same interface between the non-conductive material layers 19 is constant. According to this structure, since asperities on the inner peripheral edge side of the coils 20, 20*a*, 20*b*, and 20*c* can be decreased, occurrence of loss due to current concentration or the like can be suppressed.

Figure 29:
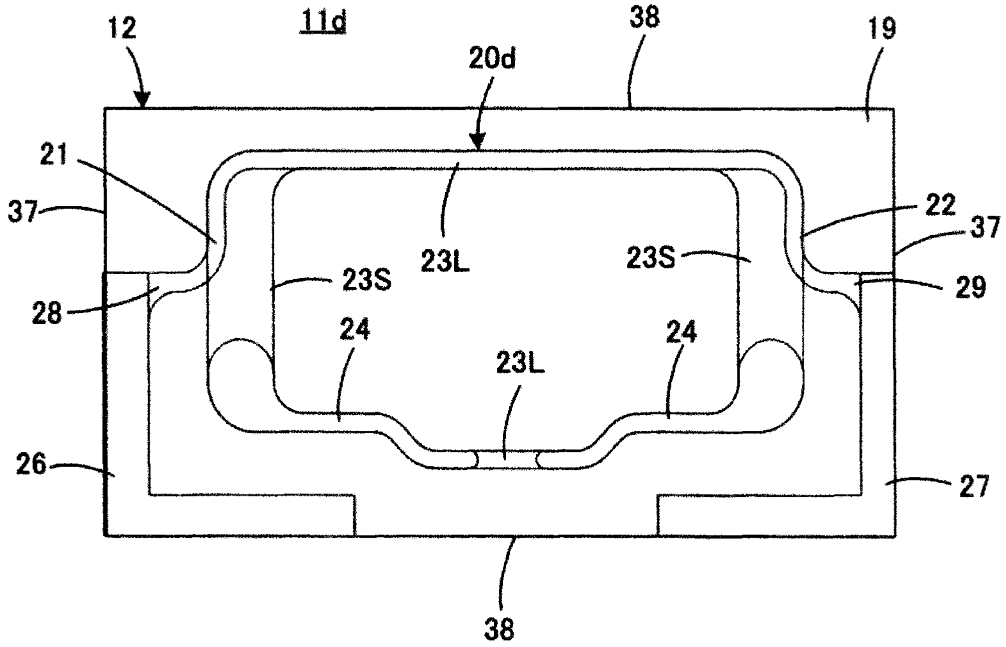
FIG. 29 is a view depicting an inductor, corresponding to FIG. 2.

Next, with reference to FIG. 29, an inductor 11*d* according to a fifth embodiment of the present disclosure is described. FIG. 29 is a view corresponding to FIG. 2. In FIG. 29, components corresponding to components depicted in FIG. 2 are provided with the same reference numeral and redundant description is omitted.

In the inductor 11*d* depicted in FIG. 29, unlike the first to fourth embodiments, the dimension of the line conductor 23 in the width direction in the same interface between the non-conductive material layers 19 is not constant. In the inductor 11*d* depicted in FIG. 29, the principal surface of the non-conductive material layer 19 has a rectangular shape having short sides 37 and long sides 38, and the shape of a coil 20*d* transparently viewed in the axis-line direction is an approximate rectangle. The line conductor 23 has short-side portions 23S extending along the short sides 37 and long-side portions 23L extending along the long sides 38, and the short-side portions 23S each have a line width longer than that of the long-side portions 23L.

According to this structure, in the line conductor 23, since the line width of the short-side portions 23S is larger than the line width of the long-side portions 23L, the inner peripheral edge shape of the coil 20*d* can be made closer to a square. Thus, occurrence of magnetic flux interference can be suppressed, that is, a high Q value can be acquired without much degrading inductance acquisition efficiency.

Also, in the inductor 11*d* depicted in FIG. 29, the curved via conductor 24 extends from the short-side portions 23S of the line conductor 23 over the long-side portion 23L, and portions connected to the short-side portions 23S are wider than portions connected to the long-side portion 23L. According to this structure, the area of contact between the line conductor 23 and the via conductor 24 increases, and connection reliability can be improved.

Figure 30:
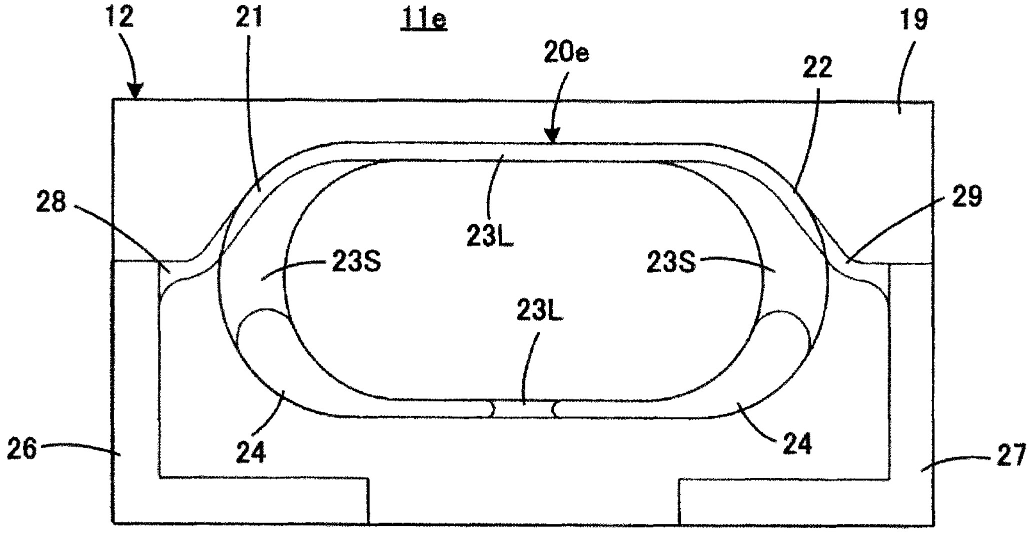
FIG. 30 is a view depicting an inductor, corresponding to FIG. 2.

Next, with reference to FIG. 30, an inductor 11*e* according to a sixth embodiment of the present disclosure is described. FIG. 30 is a view corresponding to FIG. 2. In FIG. 30, components corresponding to components depicted in FIG. 2 are provided with the same reference numeral and redundant description is omitted.

Also in the inductor 11*e* depicted in FIG. 30, substantially similarly to the inductor 11*d* depicted in FIG. 29 described above, the non-conductive material layer 19 has a rectangular shape having the short sides 37 and the long sides 38, the line conductor 23 has short-side portions 23S extending along the short sides 37 and long-side portions 23L extending along the long sides 38, and the short-side portions 23S each have a line width larger than that of the long-side portion 23L. However, in the inductor 11*e* depicted in FIG. 30, unlike the inductor 11*d* depicted in FIG. 29, the shape of a coil 20*e* transparently viewed in the axis-line direction is an oval.

According to this structure, in the line conductor 23, since the line width of the short-side portions 23S is larger than the line width of the long-side portions 23L, the inner peripheral edge shape of the coil 20*e* can be made closer to a circle. Thus, occurrence of magnetic flux interference can be suppressed, that is, a high Q value can be acquired without much degrading inductance acquisition efficiency.

Also in the inductor 11*e* depicted in FIG. 30, the curved via conductor 24 extends from the short-side portions 23S of the line conductor 23 over the long-side portion 23L, and portions connected to the short-side portions 23S are wider than portions connected to the long-side portion 23L. According to this structure, the area of contact between the line conductor 23 and the via conductor 24 increases, and connection reliability can be improved.

Figure 31:
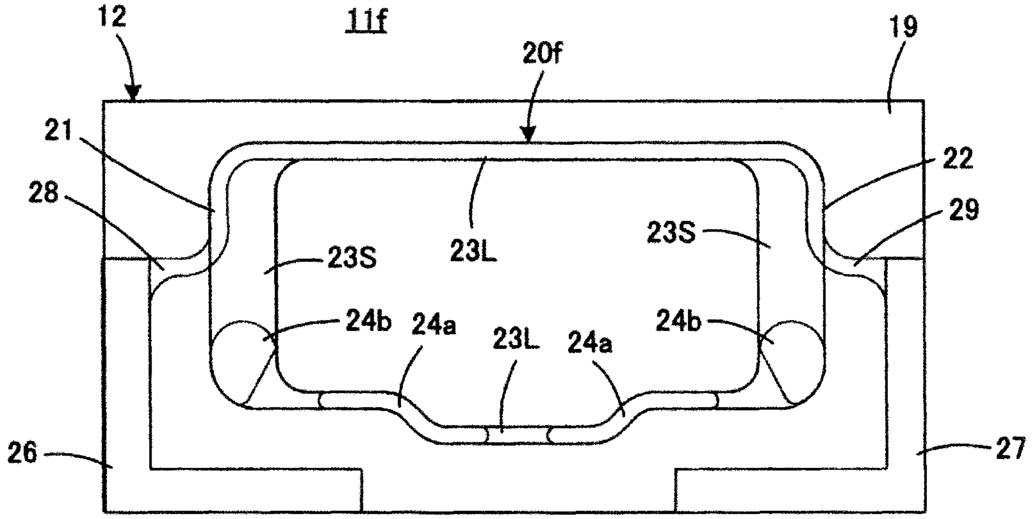
FIG. 31 is a view depicting an inductor, corresponding to FIG. 2.
Figure 32:
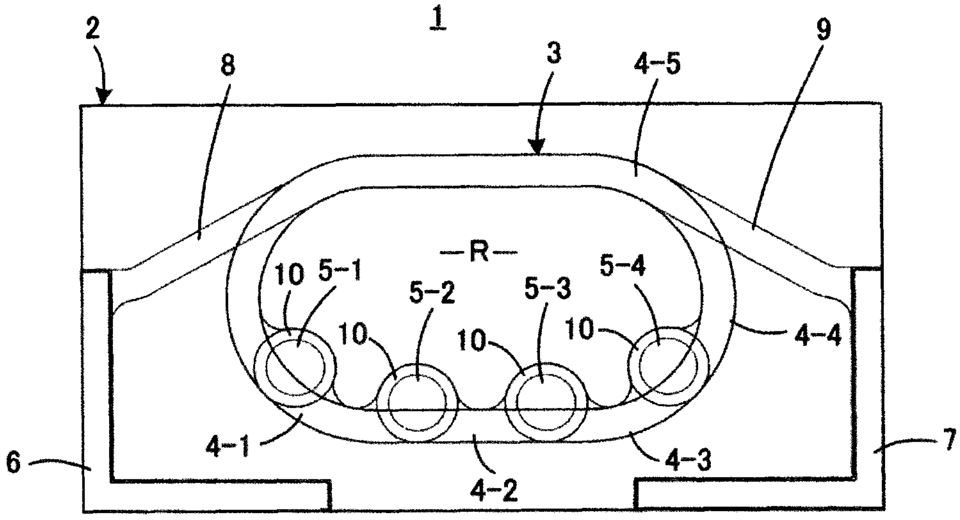
FIG. 32 is a transparent view of an inductor along an axis-line direction of a coil.

Next, with reference to FIG. 31, an inductor 11*f* according to a seventh embodiment of the present disclosure is described. FIG. 31 is a view corresponding to FIG. 2.

The inductor 11*f* depicted in FIG. 31 has a structure substantially similar to the structure of the inductor 11*d* depicted in FIG. 29 described above, except for the mode of the via conductor 24. Therefore, in FIG. 31, components corresponding to components depicted in FIG. 29 are provided with the same reference characters and redundant description is omitted.

The inductor 11*f* depicted in FIG. 31 includes two curved via conductors 24*a* and two spot-shaped via conductors 24*b*. From the shape of a coil 20*f* transparently viewed in the axis-line direction, each curved via conductor 24 in the inductor 11*d* depicted in FIG. 29 described above can be viewed as being divided into the curved via conductor 24*a* and the spot-shaped via conductor 24*b*.

As depicted in FIG. 31, each curved via conductor 24*a* is provided so as to be in contact with the relatively-narrow long-side portion 23L of the line conductor 23, and each spot-Shaped via conductor 24*b* is provided so as to be in contact with the relatively-wide short-side portion 23S of the line conductor 23.

While the present disclosure has been described above in association with several depicted embodiments, various other modifications can be thought in the scope of the present disclosure.

For example, in the depicted embodiments, the coils 20, 20*a*, 20*b*, 20*c*, 20*d*, 20*e*, and 20*f* are each arranged in a state in which its axis line is oriented to a direction parallel to the mount surface 13 inside the component main body 12. However, by changing the laminating direction of the non-conductive material layers, the axis line of the coil may be oriented to a direction orthogonal to the mount surface. Also, as being oriented to a direction parallel to the mount surface, the axis line of the coil may be oriented to a longitudinal direction (for example, a left-right direction in FIG. 2) of the component main body.

Also in the depicted embodiments, the external terminal electrodes 26 and 27 are each provided over two surfaces, that is, the mount surface 13 of the component main body 12 and its adjacent first end face 17 and second end face 18, respectively. However, for example, the external terminal electrodes 26 and 27 may be formed so as to extend to the top surface 14 and the first side surface 15 and the second side surface 16, respectively, or may be formed only on the mount surface 13. The area of forming each external terminal electrode can be freely changed as required.

Also, the total number of turns of the plurality of line conductors included in the coil can be freely changed by changing the number of connections between the line conductors and the via conductors.

Furthermore, each embodiment described in the specification is an example, and partial replacement or combination in structure can be made among different embodiments.

What is claimed is:

1. An inductor comprising:

a component main body including a non-conductive material; and a coil inside the component main body and having a plurality of line conductors, each extending along a principal surface of the component main body, and a plurality of via conductors each extending perpendicularly to the principal surface of the component main body, the coil having a helical orbit by the line conductors and the via conductors being connected together, wherein the plurality of line conductors include a first line conductor and a second line conductor in different layers, the plurality of via conductors include a curved via conductor in a long and curve shape extending along the first line conductor and the second line conductor, the curved via conductor being directly connected to both the first line conductor and the second line conductor, and when transparently viewed in an axis-line direction of the coil, the curved via conductor, the first line conductor, and the second line conductor overlap.

2. The inductor according to claim 1, wherein the helical orbit has a corner portion defining a corner, and the curved via conductor is positioned at the corner portion.

3. The inductor according to claim 1, wherein the curved via conductor has a curved portion with a curve angle from 90 degrees to smaller than 180 degrees.

4. The inductor according to claim 1, wherein the curved via conductor has a curved portion with a curve angle from exceeding 180 degrees to 270 degrees.

5. The inductor according to claim 1, wherein the curved via conductor has curved portions at two or more locations.

6. The inductor according to claim 5, wherein the curved via conductor has the curved portions at three or more locations.

7. The inductor according to claim 1, wherein one of the plurality of line conductors has a number of turns being from 0.7 turns to smaller than 2 turns.

8. The inductor according to claim 1, wherein the plurality of line conductors each have a constant number of turns smaller than one turn.

9. The inductor according to claim 1, wherein one of the plurality of line conductors has a constant dimension in a width direction.

10. The inductor according to claim 1, wherein the component main body has a rectangular parallelepiped shape, and the principal surface has a rectangular shape having a short side and a long side, the first line conductor has a short-side portion extending along the short side and a long-side portion extending along the long side, and the short-side portion has a line width larger than a line width of the long-side portion, and in the curved via conductor, a portion connected to the short-side portion has a line width larger than a line width of a portion connected to the long-side portion.

11. The inductor according to claim 2, wherein the curved via conductor has a curved portion with a curve angle from 90 degrees to smaller than 180 degrees.

12. The inductor according to claim 2, wherein the curved via conductor has a curved portion with a curve angle from exceeding 180 degrees to 270 degrees.

13. The inductor according to claim 2, wherein the curved via conductor has curved portions at two or more locations.

14. The inductor according to claim 3, wherein the curved via conductor has curved portions at two or more locations.

15. The inductor according to claim 4, wherein the curved via conductor has curved portions at two or more locations.

16. The inductor according to claim 2, wherein one of the plurality of line conductors has a number of turns being from 0.7 turns to smaller than 2 turns.

17. The inductor according to claim 3, wherein one of the plurality of line conductors has a number of turns being from 0.7 turns to smaller than 2 turns.

18. The inductor according to claim 2, wherein the plurality of line conductors each have a constant number of turns smaller than one turn.

19. The inductor according to claim 2, wherein one of the plurality of line conductors has a constant dimension in a width direction.

20. The inductor according to claim 2, wherein the component main body has a rectangular parallelepiped shape, and the principal surface has a rectangular shape having a short side and a long side, the first line conductor has a short-side portion extending along the short side and a long-side portion extending along the long side, and the short-side portion has a line width larger than a line width of the long-side portion, and in the curved via conductor, a portion connected to the short-side portion has a line width larger than a line width of a portion connected to the long-side portion.

* * * * *